United States Patent [19]

Wang

[11] 4,118,205
[45] Oct. 3, 1978

[54] SEPARATION OF GASES

[76] Inventor: Chia-Gee Wang, P.O. Box 211, Millwood, N.Y. 10546

[21] Appl. No.: 745,565

[22] Filed: Nov. 29, 1976

[51] Int. Cl.² ........................................... B01D 45/12
[52] U.S. Cl. ......................................... 55/17; 55/407; 55/408
[58] Field of Search ............................. 55/17, 405–408

[56] References Cited

U.S. PATENT DOCUMENTS

| | | | |
|---|---|---|---|
| 1,137,774 | 5/1915 | Mazza | 55/17 |
| 2,657,802 | 11/1953 | Reed | 55/17 X |
| 3,299,616 | 1/1967 | Lucas | 55/17 |
| 4,032,306 | 6/1977 | Lee | 55/17 |

Primary Examiner—John Adee

[57] ABSTRACT

An apparatus and process for separating gaseous mixtures of molecules of different mass in which a rotating means is caused to eject a contiguous plurality of successsive groups of molecules into an evacuated space to form a continuous stream of said mixture; the molecules of each said group of molecules are allowed to move in accordance with their thermal velocities for a predetermined period of time following ejection, thereby to allow each said group of molecules to form a generally spherical configuration the outer radius of which will be enriched, in molecules of lighter mass, relative to lesser radii, a deflector means co-rotating with said rotating means is used to deflect molecules, which have been allowed to move for said predetermined period of time in accordance with their thermal velocities, from at least one desired portion of said stream and a stationary collector means disposed to receive said deflected molecules.

9 Claims, 6 Drawing Figures

SEPARATION OF GASES

This invention relates to a process and apparatus for the separation of mixtures of gases having molecules of different mass. The invention is particularly, though not exclusively, suitable for the separation of gaseous isotopes.

Although as described herein the present invention is applied to the separation of isotopes of uranium hexaflouride ($UF_6$), it will be appreciated that the invention is suitable for separating isotopes of any gas or molecules of different masses in any mixture of gases.

At the present time separation of gaseous isotopes is achieved primarily by a diffusion process which has the disadvantage of a low separation constant with the result that high purity of separated isotopes is achieved only by the use of a large plurality of separating operations. Methods of separating isotopes, and in particular, methods of separating uranium isotopes have been extensively studied (see, for example, "Report of Uranium Isotope Separation, Review (of) Ad Hoc Committee" Oak Ridge Report ORO-694 June, 1972, by Benedict et al and "Diffusion Separation Methods," Encyclopedia of Chemical Technology, Second Ed. Interscience Publishers, 1965 by von Halle et al) and this has included consideration of "time-of-flight" process to which the present invention is related. Prior to the present invention no practical method of isotope separation has been proposed in which the design of the apparatus to carry out the method can be varied to alter the separation constant, a separation constant for each operational stage as high as that of the present invention is possible, separation of any gaseous mixture of molecules of different mass is possible and in, for example, the case of uranium the separation of isotopes of vapor derived directly from uranium hexafluoride in its solid form is possible.

Time-of-flight separation is basically a mechanical analog of the diffusion barrier. As a cloud of gas moves through an evacuated region, the faster moving lighter particles concentrate toward the outer portion of the beam configuration which when collected is, therefore, enriched in the lighter particles. Similarly, the inner portion would be depleted in the lighter particles when collected. However, a continuous and stationary source beam would not give rise to separation as the inner portion of one layer of cloud is equivalent to the outer portion of the subsequent layer of clouds. In previous proposals a chopper for the beam is required to cut the beam into individual layers and extensive pumping is needed to evacuate the system to a sufficiently high level of vacuum to maintain the integrity of the molecules during their time-of-flight. In 1942, E. Bagge published a paper (entitled "Concerning the Possibility of Enriching the Light Isotope of Uranium by Means of the Isotope Sluice" in Deutsche Forschungbericlte), utilizing synchronized choppers, collectors and powerful pumps. A cascade of such time-of-flight units was constructed to separate the uranium isotope. However, the necessity of operating the system at a very low gas pressure and the limited efficiency of collection proved to be a major drawback and resulted in a very low throughput and a very high consumption of pumping energy.

As disclosed in an article entitled "The Gas-Separating Chamber, System "Bagge", "by Von K. Diebner, on pages 417 and 418 of Volume 5 of the Publication "Kerntechnik" in 1963, it has been proposed to separate gaseous isotopes by cutting a stream of gas into discrete clouds, moving these discrete clouds through an evacuated space and after a predetermined time during which the forefront of the cloud will be enriched in lighter molecules, utilizing a rotating collector to separate the head of the cloud from the main body of the cloud. Such an arrangement is inefficient in view of its collection only of a small portion of the enriched outer surface of the cloud and because the apparatus can only deal with separate discrete clouds of gases rather than a continuous stream such as that which can be handled by the process and apparatus of the present invention by virtue of the use of co-rotating nozzles and collectors.

In addition a stationary nozzle and collector arrangement has been proposed by E. W. Becker for the separation of gaseous isotopes and the nozzle and collector of this arrangement are generally known respectively as the "Becker nozzle" and "Becker collector." The "Becker arrangement" as originally proposed gives rise to very limited separation and, even with development, has never given rise to separation constants of sufficient magnitude to render the process a practical and economical proposition.

U.S. patent application Ser. No. 528,128, filed Nov. 29, 1974 by the inventor for the invention, the subject of the present application, discloses an apparatus and process utilizing a co-rotating combination of nozzles and collectors operating on a substantial variation of the time-of-flight process.

Reference is also made to U.S. Pat. Nos. 3,320,722; 3,299,616; 3,710,279; 3,362,131 and to Anderson and Davidovits paper published in "Science" Vol. 187 page 642 in 1975.

It is an object of the present invention to provide a method and apparatus for separating gaseous isotopes in which the specific power requirement is lower than that of the processes of the prior art the separation constant can be made substantially higher than that of the processes of the prior art and, the centrifugal force required is two or more orders of magnitude lower than that of previously proposed centrifuge methods.

The present invention differs from the prior art proposals by providing a co-rotating combination of nozzle and deflectors with stationary collectors disposed circumferentially about the co-rotating assembly and while the present invention is a variation of the time-of-flight process it differs materially in concept, practical application and effectiveness from previously proposed forms of the process.

According to one aspect of the present invention there is provided a process for separating gaseous mixtures of molecules of different mass comprising the steps of: causing a rotating means to eject a contiguous plurality of successive groups of molecules into an evacuated space to form a continuous stream of said mixture; allowing the molecules of each said group of molecules to move in accordance with their thermal velocities for a predetermined period of time following ejection, thereby to allow each said group of molecules to form a generally spherical configuration the outer radius of which will be enriched, in molecules of lighter mass, relative to lesser radii, using a deflector means co-rotating with said rotating means to deflect molecules, which have been allowed to move for said predetermined period of time in accordance with their thermal velocities, from at least one desired portion of said stream, and using a stationary collector means to collect said deflected molecules.

According to another aspect of the invention there is provided an apparatus for separating gaseous mixtures of molecules of different mass comprising: a vacuum chamber; a nozzle supported within said chamber, arranged for rotation about an axis normal to its emitting axis and arranged to discharge a stream of said mixture into said chamber, deflector means spaced from and arranged to co-rotate with said nozzle, said deflector means being positioned relative to said nozzle to deflect a desired portion of said stream when the molecules of said stream have been permitted to move in accordance with their thermal velocities for a predetermined period of time following their discharge from said nozzle, and stationary collector means positioned relative to said deflector means to collect said deflected molecules.

The theory of the present invention, and a proccess and apparatus embodying the present invention will now be described, by way of example, with reference to the accompanying drawings, in which.

Although the present invention is applicable to all gaseous isotopes and gaseous mixtures of molecules of different mass, it will be described in the following description with reference to uranium hexaflouride [$UF_6$].

Figure 1:
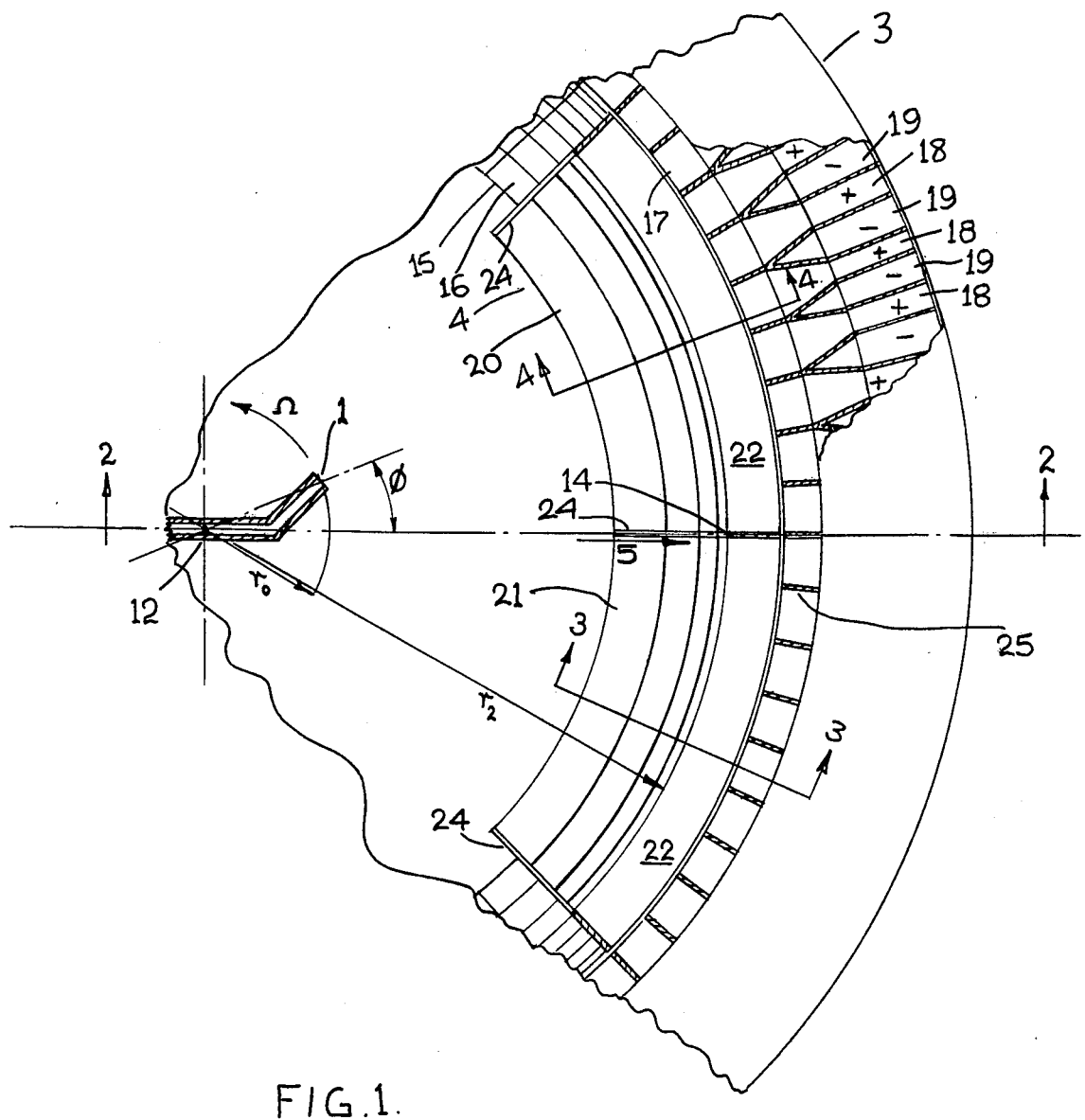
FIG. 1 is a fragmentary diagrammatic sectional plan, along section line 1—1 shown in FIG. 2 of a separating chamber forming the apparatus.
Figure 2:
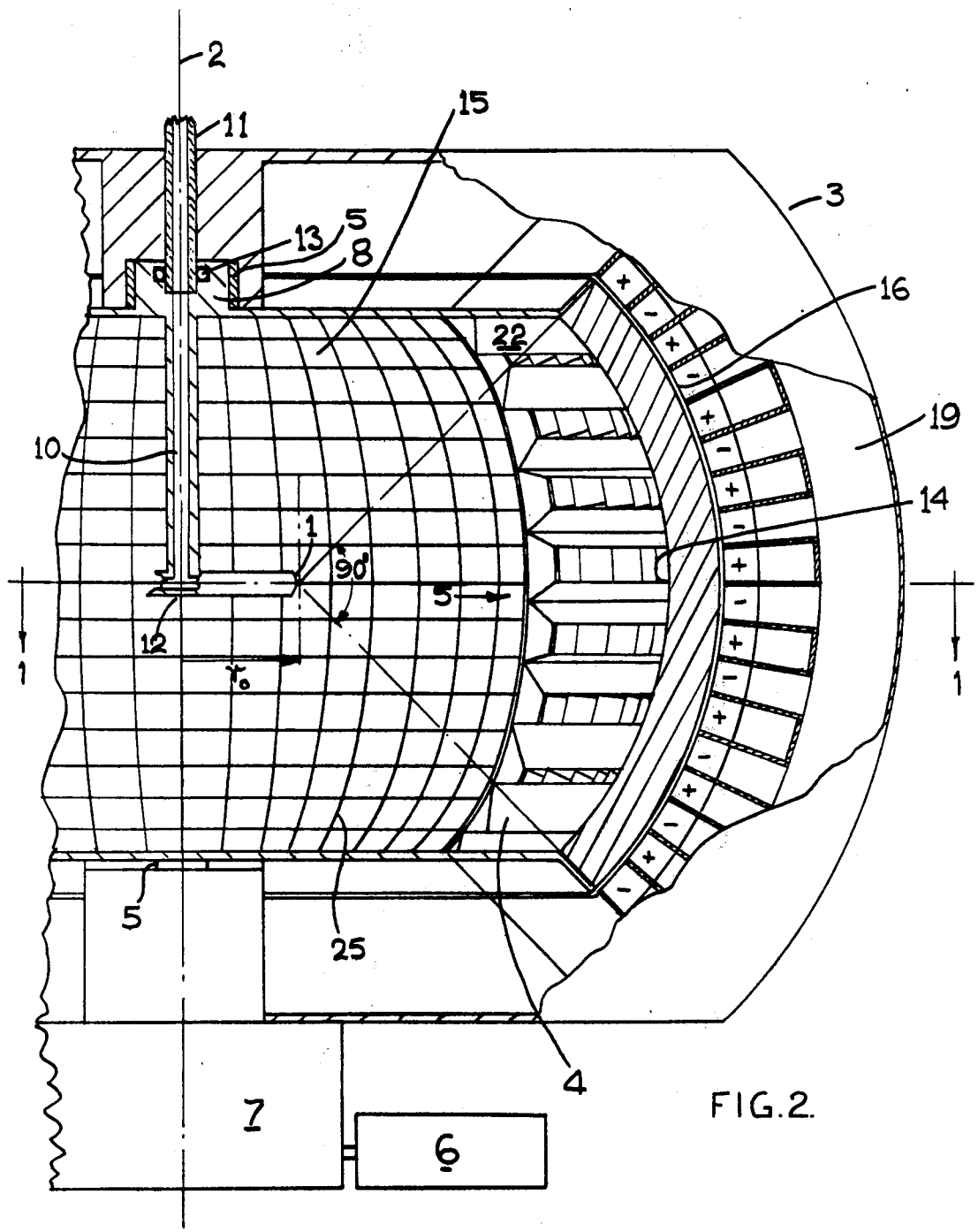
FIG. 2 is a diagrammatic sectioned elevation along section line 2—2 shown in FIG. 1 showing one portion of the apparatus.

In accordance with the theory of the present invention gas molecules are directed into an evacuated chamber through a rotating supersonic nozzle 1 having an angular velocity $\Omega$ about an axis 2 (FIG. 1).

The gas is ejected with arbitrary angular momentum and is collected at a radius $r_2$. As the radial velocity of the gas $v_r$ accelerates upon expansion into a vacuum, the temperature reduces in and around the nozzle and the velocity distribution of the gas narrows toward its most probable thermal speed. Collision of the gas molecules becomes less important as they fly into the vacuum and trace out a set of Archimedean spirals from their subsequent gas clouds. The angular velocity $\Omega$ is the same for the nozzle, spirals, and the deflectors, and the separative factor ($\alpha - 1$) of the gas becomes linear to $\Omega r_2$.

Let the thermodynamic properties of the gas be described by the Pressure P, Temperature T, Molecular weight M and their isotopic difference $\Delta M$, and number density $\rho$. In an adiabatic and collision dominated expansion the Bounelli's equation gives, $$T = T_o\{1 - (\gamma - 1) v^2/2C_o^2\}, \tag{1}$$

where $v$ is the flow velocity, $T_o$ and $C_o$ are temperature and sound velocity at $v = 0$. $\gamma = 8/6$, is the ratio of specific heats for $UF_6$. From Eq. (1), $$v_1^2 = (1 - T_1/T_o) 2 C_o^2/(\gamma - 1)$$

$$= (137 \text{ m/sec})^2 \tag{2}$$

For $T_o = 300°$ K, $C_o = 97$ m/sec, and $T_1 = 200°$ K. We limit the collision dominated expansion to essentially the convergent - divergent nozzle. As the gas expands into vacuum, pressure gradient accelerates the gas flow from $v_1$ while the temperature $T_1$ remains constant and collision rapidly becomes unimportant and no work is done by the gas. $V_1$ is slightly supersonic for $UF_6$ but is still less than 1/10 of the velocity of sound of hydrogen gas. Accordingly, if desired the initial stage of cooling and expansion may be accomplished by the use of hydrogen (or helium) as a forming gas (carrier fluid) or even scavanger gas.

For radial flow in steady state, $d/dt = \delta/\delta t + v d/dr$, and the force equation $$\rho M \, dv/dt + \Delta P = 0 \tag{3}$$

becomes, $$v \, dv/dr + (1/\rho M) \, dP/dr = 0, \tag{4}$$

and with $P = \rho k T$, and $\rho v r^2 = $ constant, $\ln P = \ln \rho + $ const. $= - \ln v r^2 + $ const., Eq. (4) becomes, $$v \, dv/dr = (k T_1/M) \, d \ln v r^2/dr = 0. \tag{5}$$

Integrating (5), $$v^2(r) = v_1^2 + (2 k T_1/M) (\ln v/v_1 + 2 \ln r/r_1). \tag{6}$$

Now with a difference in mass $\Delta M$, the difference in velocity $\Delta v(r)$ is, $$2 v \Delta v = - (2 k T_1 \Delta M/M^2) (\ln v/v_1 + 2 \ln r/r_1) + (2 k T_1/M) (v_1/v) (\Delta v/v_1)$$

$$= - (\Delta M/M) (v^2 - v_1^2) + (2 k T_1/M) \Delta v/v. \tag{7}$$

In a typical dimension under consideration, $r_2/r_1 \geqq 10$, and $v_2/v_1 \geqq 2$, while $k T_1/M \simeq v_1^2$, so Eq. (7) becomes, $$\Delta v/v^2 = - (\Delta M/2 M v) (1 - v_1^2/v^2) / (1 - k T_1/M \, v^2)$$

$$\simeq - \Delta M/2 M v \tag{8}$$

Now consider the Archimedean spiral with angular span $\phi$ and angular velocity $\Omega$. From $$dr/r \, d\phi = - v \, dt/r\Omega dt \tag{9}$$

we have, $$\phi = -\Omega \int_{r_2}^{r_1} dr / v(r), \tag{10}$$

and the angular difference $\Delta \phi$ due to the velocity difference $\Delta v$ is, $$\Delta \phi = \Omega \int_{r_2}^{r_1} dr \Delta v / v^2 \tag{11}$$

together with Eq. (8), $$\Delta \phi = -(\Omega \Delta M / 2M) \int_{r_2}^{r_1} dr / v$$

-continued $$= -(\Omega \Delta M / 2M)(4kT_1/M)^{-1/2} \int_{r_2}^{r_1} dr / (b^2 + \ln r/r_1)^{1/2},$$

where $b^2 = (M/4k\,T_1)\,v_1^2 + \ln(v/v_1)^{1/2}$ is a very slowly varying function of $r$ and can be considered a constant in the integration. That is, $$\Delta \phi \simeq \frac{-\Omega \Delta M}{2(4kT_1M)^{1/2}} \int_{r_2}^{r_1} 2\, r_1\, e^{-b^2} e^{(b^2 + \ln r/r_1)} d\sqrt{b^2 + \ln r/r_1} \quad (12)$$

$$\simeq \frac{-\Omega \Delta M \cdot 2}{2(4kT_1M)^{1/2}} (r_2 - r_1) \simeq \frac{-\Omega \Delta M r_2}{(4kT_1M)^{1/2}},$$

as $r_2 >> r_1$. The linear separation of the population $r_2\Delta\phi$ is now, $$r_2 \Delta \phi \simeq - r_2 \Omega \Delta M (r_2 - r_1) / (4k\, T_1 M)^{1/2}. \quad (13)$$

Light molecules generally have far larger ratio $\Delta M/M$ and therefore larger separation distance. The cooler gas has smaller spread in velocity and therefore gives larger separation in population. The gas travels in essentially radial direction while the trace of the gas clouds forms the Archimedean spiral with angular velocity $\Omega$ for $r$, so there is a difference in speed $\Omega r$ between the clouds. We shall show that the separative factor is related in part with the velocities $v_1$ and $v_2$, and in part related with $\Omega r$. In other words, the gas molecules are not spun into high velocity as in a centrifuge, only the deflectors do, so the work performed on the gas is essentially the compression expansion in order to arrive at the velocity $v_2$.

We now consider the initial angular momentum carried by the gas cloud upon leaving the ejecting nozzle. The gas travels radially regardless of the initial angle of ejection since $r_2 >> r_o$, the length of the nozzle. The ejecting angle determines only its corresponding position of the designated deflectors. Assuming initially $v_\phi = v_1$ for maximum angular momentum, the velocity $v_\phi$ as well as the difference of velocity $\Delta v_\phi \sim \Delta M\, v_\phi/2M$ need to be scaled by the factor $r_o/r_2$ for the conservation of angular momentum; that is, $$\Delta v_\phi(r_2) = - \Delta M\, r_o\, v_1/2\, M\, r_2, \quad (14)$$

and this value is much smaller than the difference of the span of the spiral length over time $t$ for the gas to go from $r_1$ to $r_2$, $$\Delta v_\phi << \Delta v_r = r_2 \Delta \phi/t = \Delta\phi(v_1 + v_2)/2. \quad (15)$$

For a deflector at $r_2$, the incoming gas shall have a velocity difference $\Delta v$, with Eq. (12), $$\Delta v = \Delta v_\phi + \Delta v_r \simeq \Delta v_r \simeq - \Omega \Delta M (r_2 - r_1)(v_1 + v_2)/4 (k T_1 M)^{1/2} \quad (16)$$

In the apparatus deflectors are co-rotating with the nozzle as well as with the Archimedean spirals of molecules at an angular velocity $\Omega$. There can be 4, 6, or more nozzle - deflector sets operating in one chamber, although only one set is shown in the drawings. The deflectors deflect enriched as well as depleted streams. Those which deflect the enriched stream deflect the gas to collectors for the enriched stream while those for the depleted stream deflect the depleted stream to collectors for the depleted stream. The collectors are outside of the rotating deflectors and receiving the gas directed by the deflectors. The collectors alternate in enriched and depleted form as indicated in the drawings respectively by "+" and "−". The angle of the deflectors is such that except for slightly deflecting the gas to the appropriate collector, they let the gas freely pass without accelerating it to the deflectors rotational speed. The collectors are composed of convergent walls designed to convert some of the supersonic kinetic energy into pressure. The gas of low density and high velocity, would form a shock front. This front must be maintained inside the collector by emptying the collector with sufficient speed, because otherwise, the front would expand back into the deflector zone and load the chamber. The gas in the stationary collectors is subjected to a subsequent compression - expansion cycle. If forming gas is present, a third set of collectors is required to channel it. Note that forming fluid travels in a completely different set of spirals, at a distance $r_2$, would be completely separated from the seed gas in question. And in place of forming gas, one can eject a scavenger gas, if needs be, in a similar manner. The last item may be useful for the selective excitation of gaseous $UF_6$ by lasers.

Consider an one-dimentional Maxwellian distribution $f(v)$ with temperature $T_1$, $$f(v)\, dv = (M/2\pi kT_1)^{3/2} \exp(-Mv^2/2kT_1)\, 4\pi\, v^2\, dv, \quad (17)$$

and the additional population $\Delta N$ from the velocity increment $\Delta v'/2$ is, from Eq. (17), $$\Delta N (v' \leq v \leq v' + \Delta v'/2) = g^{3/2} e^{-g} (2/\sqrt{\pi})\, \Delta v'/v', \quad (18)$$

where $g \equiv Mv'^2/2kT_1$.

$$N(v > v') = \int_{v'}^{\infty} f(v) dv = \quad (19)$$

$$\frac{2\, e^{-g}}{\sqrt{\pi}} \left( \sqrt{g} + \frac{1}{2\sqrt{g}} - \frac{1}{4\, g^{3/2}} + \cdots \right)$$

$$= 1/2 \text{ for } g \simeq 1.0.$$

From $N(v \geq v') = N(v \leq v') = \frac{1}{2}$, the cut of the separation $\theta = \frac{1}{2}$, then $\alpha = 1 + 4\, \Delta N/N$ as $$\alpha = 1 + \frac{4 \times 2}{e\sqrt{\pi}} \cdot \frac{1}{1/2} \cdot \frac{\Delta v'}{v'} = \quad (20)$$

$$1 - \frac{16}{e\sqrt{\pi}} \cdot \frac{\Omega \Delta M(r_2 - r_1)(v_1 + v_2)}{4\sqrt{kT_1M}\, \sqrt{2kT_1/M}}.$$

The separative factor $\psi$, $$\psi = \alpha - 1 = - 4\, \Delta M \Omega (r_2 - r_1)(v_1 + v_2)/e\sqrt{2\pi}\, kT_1. \quad (21)$$

Note that $\Delta M = -3$ in our case for $UF_6$, and $\psi$ is essentially $\Delta Mv^2/kT_1$ with some numerical factors of order unity. This is similar to the case for centrifuge where $\psi_\epsilon = \Delta M\Omega^2 r_2^2/2kT$, only in our case, the gas does not get accelerated into the speed $10^6\, r_2$, and the term $v^2$ is a combination of $(v_1 + v_2)$ and $\Omega(r_2 - r_1)$. Temperature $T_1$ in our process can be kept very low since the flow of gaseous $UF_6$ can be sent by the forming gas, and they would not condense out in the evacuated chamber.

To summarize:

1. A continuous and self-renewal beam of seed molecules is supplied by the rotating nozzle without gate or shutter;

2. The gas clouds form an Archimedean spirals, giving rise to a separative factor $\psi_1 60 \Omega (r_2-r_1)(v_1+v_2)$ without having the gas accelerated to the speed of $\Omega r_2$. The process is not a centrifugal separation and the speed $\Omega r_2$ can be relaxed to a very low value if necessary;

3. Gases with different masses follow completely different spiral path and forming gas or scavenger gas can be used and would automatically separate upon exit;

4. Substantial cooling of the seed gas can be obtained without refrigeration, and without condensation at subfrozen point. With the compounds of very low vapor pressure such as the uranium salts, the combination of cooling, large flow, and automatic separation of the forming gas should be important for selective excitations by lasers.

5. The processing chamber is simple in structure with no relative moving parts within. Part of the kinetic energy of the compression - expansion cycle is recoverable.

The rotating nozzle/deflector assembly is housed in a chamber 3 forming a vacuum enclosure, an outer enclosure whose vacuum level is maintained at the average chamber pressure may be provided in order to minimize the pressure gradient across the chamber wall so that the diffusive leak from the chamber may be small enough to be ignored. The vapor pressure of $UF_6$ at room temperature is much higher than that of the processing chamber, so for $UF_6$ and for limited production, perhaps the material can be handled and stored in solid form and each processing chamber can therefore handle a variety of enrichment concentrations in order to reduce the number of total units for a given number of stage of separation.

The drawings illustrate, in diagrammatic form, one section of a chamber 3 with a nozzle 1 and deflector structure 4 mounted therein for rotation about a vertical axis 2. The chamber and nozzle/deflector assembly are generally circular in plan and the nozzle/deflector assembly is mounted for rotation in bearings 5 about the axis of rotation 2 by motor 6.

Bearings 5 are supported by the chamber 3 and a support structure 7. The nozzle/deflector assembly is supported in the upper bearing 5 by means of a spigot 8 disposed on axis 2.

Extending coaxially along the axis of rotation 2 from the top of the chamber 3 to the central plane 9, which is normal to axis 2 of the chamber 3, is a tubular member 10 the interior of which, at its upper end, communicates with a supply tube 11 and, at the center of the chamber in the plane 9, with a nozzle arrangement 12. The supply tube 11 is maintained stationary with respect to chamber 3, the tubular member 10 is integral with the spigot 8 and leakage between the supply tube 11 and the spigot and tubular member combination 8, 10 is prevented by a seal 13 disposed between the spigot 8 and the lower end of the supply tube 11.

The nozzle arrangement lies in the central plane 9 of rotation of the chamber about axis 2 and consists of four symmetrically arranged nozzles 1 (one only being shown). Nozzle 1 is positioned to provide a stream of gas molecules, received by way of the tubular member 10, which spirals outwardly toward the deflector structure 4. Gas molecules passed to the nozzle arrangment 12, by way of the tubular member 10, are distributed equally for ejection by nozzle 1.

Nozzle 1 is disposed at a radius $r_o$ from axis 2 and is arranged to eject molecules at an angle of lag with respect to the direction of rotation such that when the nozzle together with the chamber is rotated about axis 2 gas molecules emitted by the nozzle will travel with a spiral motion whereby the center of the stream of molecules will reach the deflector structure at ratius $r_2$ at a central point 14 of the deflector structure 4. Nozzle 1 is disposed with an angle of lead $\phi$, relative to axis 9, in the direction of rotation of the chamber 3 which is such that the median location of molecules ejected by nozzle 1 is at point 14 when the chamber 3 and nozzle 1 have rotated through angle $\phi$ about axis 2 at a rate of $\Omega$. Point 14 is the center of a spherical front 16 of expanding molecules defined by radius $r$ and is at a distance of $r_2$ from axis 2 in the plane 9 of the chamber 3.

The chamber 3 defines a collector arrangement 15 comprising a plurality of annular collector slots 16 the annular openings 17 of which face inwardly toward the periphery of a circle of radius $r_o$ centered on axis 2 and lying in the central plance 9. These openings 17 are all located at a constant distance from the periphery of this said circle. The openings 17 of the collector slots 16 are closely adjacent one another and form an annular bank of parallel openings which together define the collector arrangement. Alternative openings are assigned to, respectively, enriched collection "+" and to depleted collection "−". All "+" collector slots are connected to "+" transfer ducts 18 and all "−" collector slots are connected to "−" transfer ducts 19. The ducts 18 and 19 extend from the interior of the chamber 3 to permit passage of collected molecules to the exterior of the chamber where they may be directed to subsequent stages of separation in the case of the enriched molecules and to preceeding stages in the case of the depleted molecules.

The deflector structure which co-rotates with the nozzle arrangement 12 is located closely adjacent the openings to the collector slots 16 between these openings and the nozzle arrangement 12. The deflector structure subtends an arc of 90° both in the plane 9 and in a direction normal to this plane. The center of the deflector structure is the central point 14 with the deflector structure divided into a leading portion 20 and a trailing portion 21. The leading portion is arranged to deflect the enriched portion of the molecular cloud emitted by nozzle 1 and is located ahead of the central point 14 in the direction of rotation $\Omega$. The trailing portion 21 is arranged to deflect the depleted portion of the molecular cloud emitted by the nozzle 1 and is located behind the central point 14 with respect to the direction of rotation $\Omega$.

Figure 3:
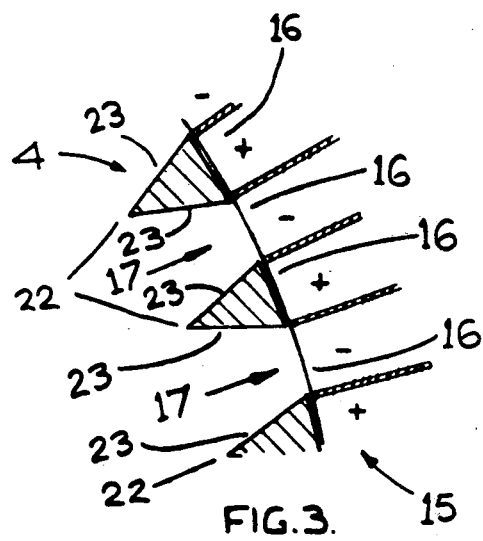
FIG. 3 is a fragmentary diagrammatic sectional elevation of said chamber along section 3—3 shown in FIG. 1.
Figure 4:
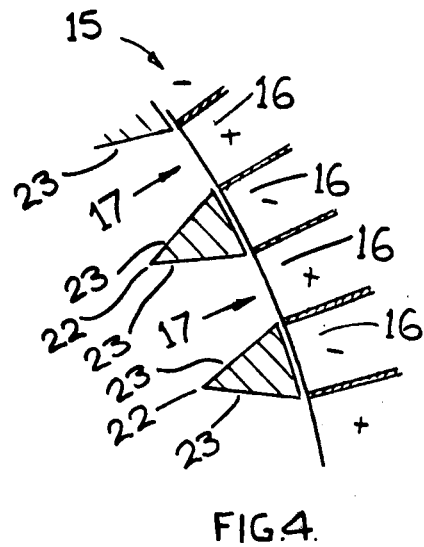
FIG. 4 is a fragmentary diagrammatic sectional elevation of said chamber along section line 4—4 shown in FIG. 1.
Figure 5:
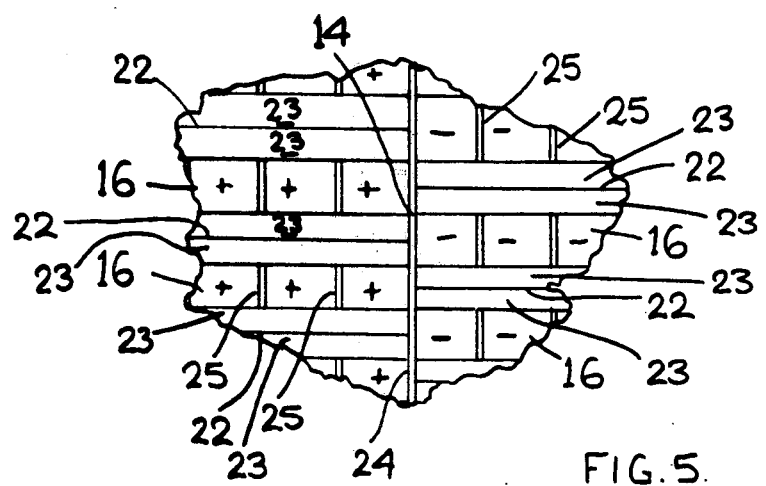
FIG. 5 is a fragmentary diagrammatic view of the chamber as seen in the direction of arrow 5 shown in FIGS. 1 and 2.
Figure 6:
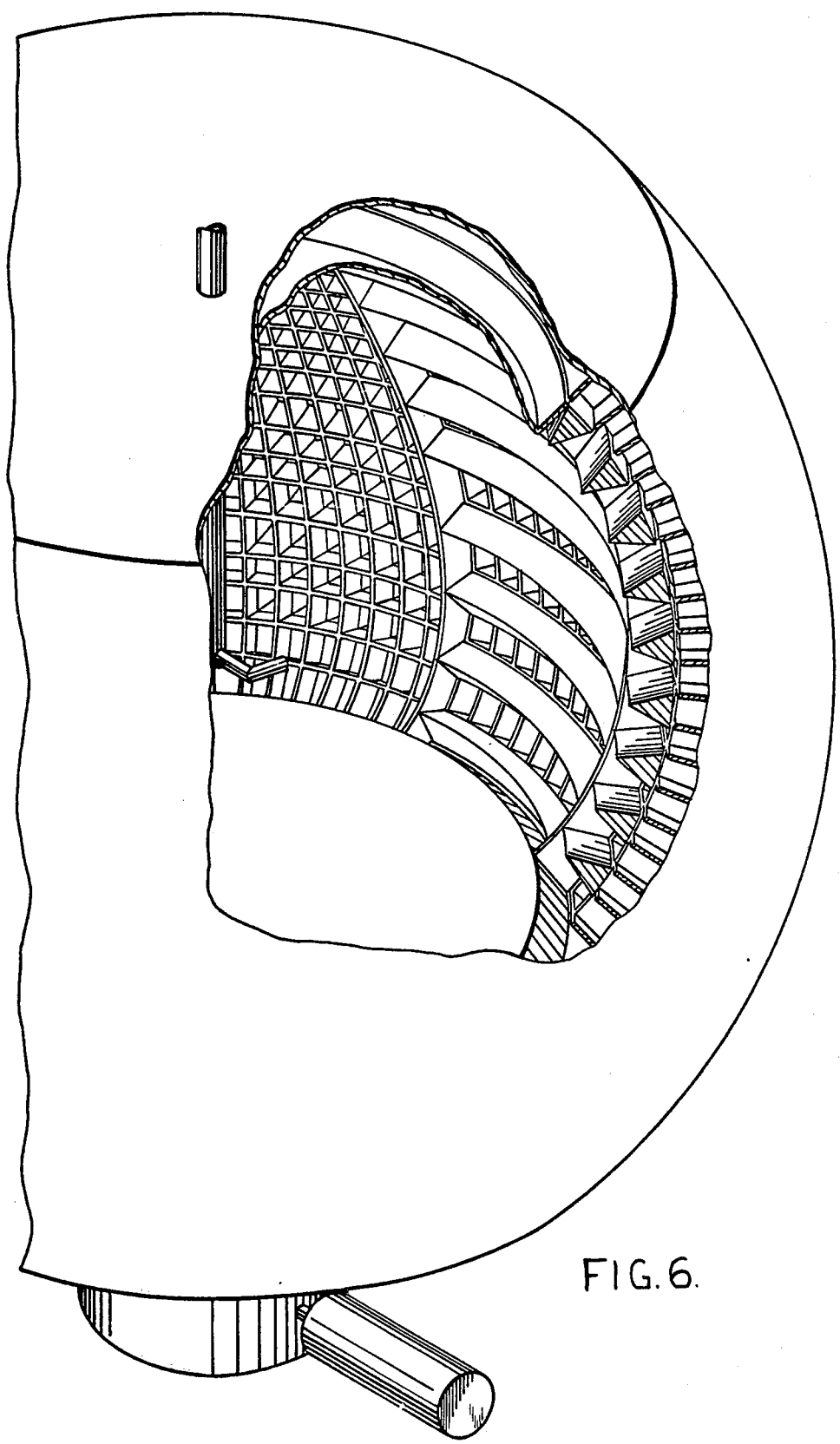
FIG. 6 is a perspective partially cut away view of the apparatus.

Each portion 20 and 21 of the deflector structure 4 consists of a plurality of arcuate deflectors 22 having deflectors surfaces 23 for deflecting molecules received from nozzle 1 to the "+" collector slots in the case of the leading portion 20 and to the "−" collector slots in the case of the trailing portion 21. FIG. 3 shows a fragmentary section through a portion of the deflector structure in the trailing portion 21 and FIG. 4 shows a similar section through the leading portion 20. The deflectors 22 not only serve to deflect enriched portions and depleted portions of the molecular cloud to, respectively, the "+" and "−" collector slots 16 but also serve to close the entrances of respectively the "−" collector slots in the leading portion and the "+" collector slots in the trailing portion (see particularly FIG. 5). The deflectors 22 are spaced apart in a manner to fully expose the openings 17 of the "+" collector slots in the leading portion and the "−" collector slots in the trailing portion.

The deflectors 22 are supported by support members 24 for co-rotation with the nozzle arrangement 12.

The annular collector slots 16 are divided into a plurality of separate parts by dividing walls 25 which extend normal to the plan 9 to divide each collector slot 16 into a plurality of rectangular passages located side by side to form the annular slot with each passage extending radially away from the circle of radius $r_o$ in the plane 9.

It will be appreciated that although a single nozzle 1 and deflector structure 4 assembly is illustrated, the chamber 3 houses four such assemblies the deflector structures of which together occupy the entire periphery of the chamber inside of the openings 17. It will also be appreciated that each nozzle and deflector structure assembly operates as a separate and individual entity while the collector slots 16 are common to all of the four nozzle-deflector structure assemblies.

For the purposes of describing the operation of the apparatus a single discreet cloud of molecules issued by the nozzle 1 will be considered. It will, of course, be appreciated that the nozzle in fact issues a continuous stream of molecules which as they expand outwardly toward the periphery of the chamber form an Archimedean spiral.

The discreet cloud of molecules is, an operation, ejected at supersonic speed by the nozzle 1 and this cloud proceeds toward the deflector structure 4 while simultaneously expanding in accordance with the thermal velocities of the molecules concerned. The lighter molecules will achieve higher thermal velocity and, accordingly, as the cloud approaches the deflector structure 4 the leading surface of the cloud will be enriched with the lighter molecules while the trailing portion of the cloud will be depleted in these lighter molecules. The deflector structure 4 which is co-rotating with the nozzle 1 is positioned relative to the nozzle 1 such that the leading portion 20 will be in position to receive the leading portion of the molecular cloud thereby to allow and deflect the leading portion, which is enriched in the lighter molecules, into the "+" collector slots 16. When the leading portion of the cloud has been collected by the positive collector slots the rotation of the deflector structure will have brought the trailing portion 21 into position to receive and deflect the trailing portion which is depleted in the lighter molecules to allow and deflect these into the "−" collector slots.

By virtue of the continuous emission of molecules by the nozzle 1 and the co-rotation of the deflector structure and the nozzle arrangement the leading portion 20 will continuously move into a position to receive the enriched portion of the emitted stream which travels toward the deflector structure in the form of an Archimedean spiral the outermost portion and (namely the portion first to reach the deflector system) of which the enriched in lighter molecules by comparison with the following portion. The angular relationship of the nozzle 1 and the deflector structure is arranged such that with the rate of rotation $\Omega$ and the dimensions of the chamber concerned the enriched portion of the Archimedean spiral will always reach the radius $r_2$ of the leading portion 20 at the then angular location of that leading portion 20 while the depleted and trailing portion will reach the radius $r_2$ of the trailing portion 21 at the then angular location of that trailing portion 21.

By way of example the apparatus and process may have the following parameters:

Chamber diameter: $D \simeq 2r_2 \simeq 20$ meters;
Length of the nozzle: $r_o = 0.1$ meters;
Number of nozzles in one chamber: 4;
Speed of the deflector-collector wall: $v_2 = 400$ meters/second;
Injection speed from the nozzle: $v_1 = 140$ meters/second;
Mean molecular thermal velocity: $v_o = 100$ meters/second;
Rotational frequency of the nozzle-wall chamber: 6.4 cycles/second;
Mean distance of separation between two populations at at the deflector-collector: $r_2 \Delta \phi = 25.6$ centimeter;
Mean free path of the chamber vacuum: $\lambda \simeq r_2$;
"Cut" of separation: $\theta = \frac{1}{2}$;
Separation constant: $\alpha = 1.2$;
Throughout of $UF_6$: 320 tons/year;
Unit capacity: 2,000 kilograms SWU/year;
Unit energy need, without regard to frictional and vacuum losses: 20 KWH/SWU;

It will be appreciated that the deflector structure may be of a very light weight construction having a strength merely sufficient to withstand the stresses resulting from its weight and rotation. This is as a result of the negligible stress generated by the deflection of deflected molecules. Also the deflectors need not be adjacent the collectors, e.g. they may be midway between the nozzle and collectors. The deflectors may be mechanical as described or, e.g. electro-magnetic.

I claim:

1. A process for separating gaseous mixtures of molecules of different mass comprising the steps of:
    causing a rotating means to eject a contiguous plurality of successive groups of molecules into an evacuated space to form a continuous stream of said mixture;
    allowing the molecules of each said group of molecules to move in accordance with their thermal velocities for a predetermined period of time following ejection, thereby to allow each said group of molecules to form a generally spherical configuration the leading portion of which will be enriched, in molecules of lighter mass, relative to lesser radii,
    using a deflector means co-rotating with said rotating means to deflect molecules, which have been allowed to move for said predetermined period of time in accordance with their thermal velocities, from at least one desired portion of said stream, and
    using a stationary collector means to collect said deflected molecules.

2. A process according to claim 1, wherein said rotating means is a nozzle directed to cause said stream to form an Archimedean spiral which expands outwardly to said deflector means.

3. A process according to claim 1 further comprising using said deflector and collector means respectively to deflect and collect molecules, which have been allowed to move for said predetermined period of time in accordance with their thermal velocities, from the leading portion of said spherical configuration formed by each successive said group and subsequently to deflect and collect the remaining molecules formed by each successive said group, thereby separately to collect a plurality of molecules enriched in said molecules of lighter mass from said leading portion and a plurality of molecules which will be depleted in said molecules of lighter mass.

4. A process according to claim 3, wherein said collector means simultaneously and separately collects molecules from a plurality of separate discrete parts of said leading portion of said spherical configuration and from a plurality of discrete separate parts of said remaining molecules of said spherical configuration.

5. A process according to claim 1 further comprising the utilization of collector means consisting of a plurality of adjacent annular parallel collectors each symmetrically arranged about the axis of rotation of said rotating means in a plane normal to said axis and deflector means consisting of arcuate deflectors lying between said rotating means and said collectors to deflect respectively enriched and depleted portions of said stream into desired collectors.

6. A process for separating a heavier from a lighter component of a gas mixture, comprising:
discharging into an evacuated space a flow of the mixture through a nozzle rotating about an axis normal to its emitting axis so that each increment of flow from the nozzle is circumferentially displaced in space from the preceding increment due to rotation of the nozzle, thereby to produce an Archimedean spiral of successive wave fronts of the components moving outwardly away from the axis of rotation;
allowing movement of said components of the gas mixture for a predetermined period of time in accordance with their respective molecular thermal velocities, thereby to permit each wave front to form outer portion of said spiral enriched in said lighter component thereby leaving the remaining portion enriched in said heavier component;
providing a deflector co-rotating with said nozzle and synchronizing the nozzle and deflector so that said deflector moves through a collecting position, when one of said portions enriched in a said component arrives thereat, but is removed from said position, due to its rotation, when the other of said portions enriched in the other component arrives thereat, so that only the gas in the portion which is at the collecting position when said deflector passes therethrough is deflected thereby, and
providing a collector to collect the deflected portion.

7. Apparatus for separating gaseous mixture of molecules of different mass comprising:
a vacuum chamber;
a nozzle supported within said chamber, arranged for rotation about an axis normal to its emitting axis and arranged to discharge a stream of said mixture into said chamber;
deflector means spaced from and arranged to co-rotate with said nozzle, said deflector means being positioned relative to said nozzle to deflect molecules from at least one desired portion of said stream when the molecules of said stream have been permitted to move in accordance with their thermal velocities for a predetermined period of time following their discharge from said nozzle; and
stationary collector means to collect said deflected molecules;
wherein said collector means comprises at least one collector in the form of an annular slit symmetrically arranged about the axis of rotation of said nozzle in a plane normal to said axis and said deflector means comprises at least one arcuate deflector lying between said nozzle and said collector means to deflect said desired portion of said stream into said annular slit, said deflector being coincident with the molecules of said desired portion of said stream after said predetermined period of time.

8. Apparatus according to claim 7 wherein said collector means comprises a plurality of said collectors disposed in adjacent parallel relationship;
said deflector means comprises a plurality of said arcuate deflectors disposed parallel to said collectors,
said deflectors being disposed to deflect portions of said stream respectively enriched and depleted in molecules of a desired one of said different masses into desired collectors.

9. Apparatus according to claim 8 wherein said plurality of collectors are disposed symmetrically about a plane defined by rotation of the emitting axis about the axis of rotation of said nozzle at a constant radius from a circle defined by said rotation of said nozzle, the collectors all being directed to directly face said circle.

* * * * *